United States Patent [19]

Wolf et al.

[11] 4,363,396
[45] Dec. 14, 1982

[54] DEVICE FOR BUILDING-UP AND DISCHARGING AN ANNULAR DUMP OF BULK MATERIAL

[76] Inventors: Helmut Wolf, Sielkamp 52, 3300 Braunschweig, Fed. Rep. of Germany; Hans J. Schlegel, 6129 72nd La., North, Minneapolis, Minn. 55429

[21] Appl. No.: 348,368

[22] Filed: Feb. 12, 1982

Related U.S. Application Data

[63] Continuation of Ser. No. 67,839, Aug. 20, 1979, abandoned, which is a continuation-in-part of Ser. No. 850,704, Nov. 10, 1977, abandoned.

[51] Int. Cl.³ .............................................. B65G 65/06
[52] U.S. Cl. ..................................... 198/508; 414/133
[58] Field of Search ...................... 198/508, 591, 865; 414/133; 366/349; 37/191 A, 192 A

[56] References Cited

FOREIGN PATENT DOCUMENTS 2114243 10/1972 Fed. Rep. of Germany ...... 414/133

Primary Examiner—John J. Love
Assistant Examiner—Douglas D. Watts
Attorney, Agent, or Firm—Salter & Michaelson

[57] ABSTRACT

A device for the building up and discharge of an annular dump of bulk on a circular storage site. In the center of the circular storage site is provided at least one jib of a dumping device rotatable about a vertical axis, which is fed with the bulk material by means of a feed belt, the discharge end of which is situated above the dumping device in the center of the device. Moreover there is provided at least one removal device which can be swivelled about said vertical axis and machinery situated in the neighborhood of the center by means of which the bulk material removed is fed to a conveyor belt passing through said vertical axis. The removal device and the jib of the dumping device are arranged on a framework which is supported and guided on at least one circular railway concentric with said axis.

13 Claims, 5 Drawing Figures

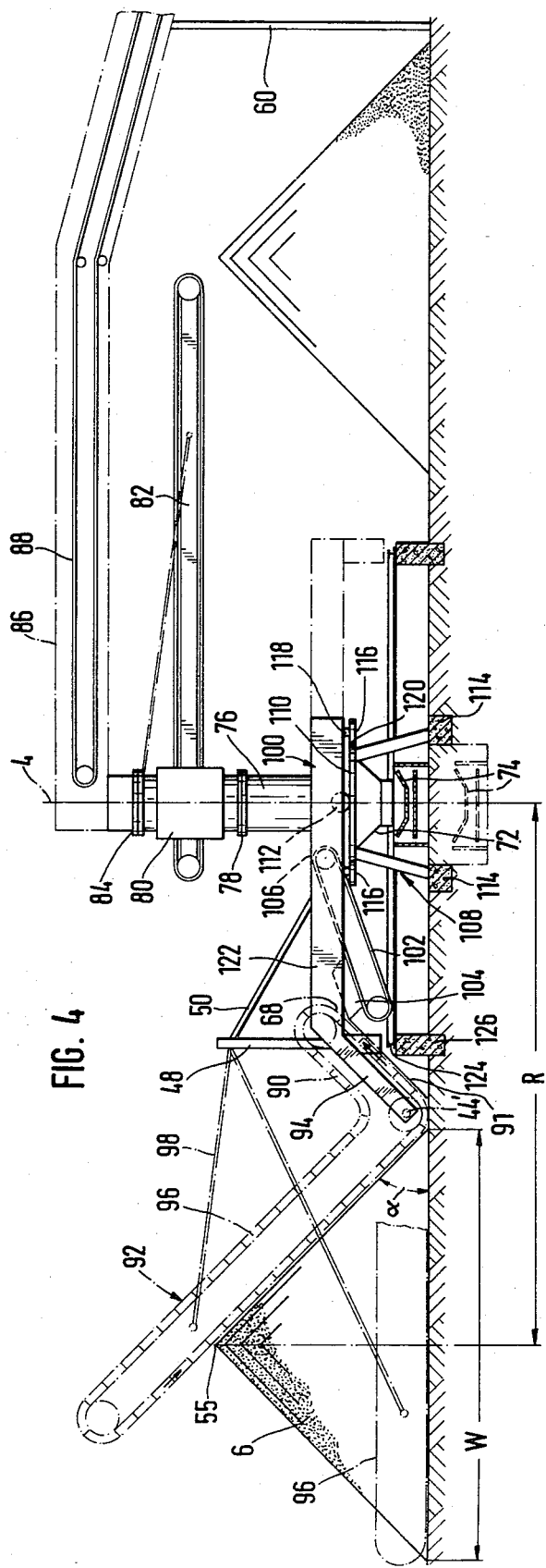

DEVICE FOR BUILDING-UP AND DISCHARGING AN ANNULAR DUMP OF BULK MATERIAL

This application is a continuation of U.S. application Ser. No. 67,839 filed Aug. 20, 1979, which application is a continuation-in-part application of U.S. application Ser. No. 850,704 filed Nov. 10, 1977, now both abandoned.

BACKGROUND OF THE INVENTION

The invention concerns a device for building-up and discharging an annular dump of bulk material on a circular storage site.

Annular dumps are space-saving means for the storage of bulk material. They are also useful for the homogenization of mixtures of granular materials which have different properties. Such a homogenization is necessary, for example, in the manufacture of cement when the starting material must have a composition within relatively narrow limits. This composition seldom occurs naturally. It must therefore be produced by mixing starting materials of different composition.

The devices for the building-up and discharging of annular dumps of bulk materials of this kind include at least one jib of a dumping device, rotatable about a vertical axis in the center of the circular storage site, at least one feed belt the discharge end of which is situated above the dumping device in the center of the device, at least one removal device which can be swivelled about said vertical axis and means situated in the neighborhood of the center by means of which the bulk material removed is fed to a conveyor belt passing through said vertical axis.

Known devices of this type generally include a fixed central component which consists, for example, of steel concrete and on which at least the jib of the dumping device is mounted on the bearings. Concrete pillars of this type require expensive foundations which must make it possible to transfer bulk material removed on to the conveyor belt which is led away through the foundation or below them. One example of the prior known devices known to applicant is illustrated in the U.S. patent to Fischer No. 3,509,985.

SUMMARY OF THE INVENTION

It is the object of the invention to produce a device which can be delivered to a large degree in a prefabricated form and for which only a small and simple foundation needs to be provided.

According to the invention the removal device and the dumping device are arranged on a framework which is supported and guided to rotate on at least one annular railway concentric with the said axis.

Preferably there is provided as the support a circular railway on which the framework is supported and guided by means of wheels.

In another embodiment the framework may be guided radially on a fixed carrying support and supported by means of bogie wheels, where the framework is provided with a lateral extension on one side on which the removal device is mounted, while the outer end of the extension is supported on a circular railway concentric with the said common axis by rolling means of support.

There is preferably provided above the conveyor belt in the neighborhood of the center of the framework a hopper above the conveyor belt, into which the material to be conveyed which has been picked up by the removal device may be discharged. The discharge end of the removal device may here be arranged to be in the neighborhood of the hopper. It is, however, also possible to arrange a chute whose end is situated over the hopper below the discharge end of the removal device. It is also possible to mount a conveyor belt in the bearings within the framework so as to have its feed end below the discharge end of the removal device and its discharge end above the hopper or the chute.

The jib of the dumping device is preferably mounted to rotate in bearings on the framework. Conveniently it is also provided in this case that the framework of the feed belt is mounted to rotate in bearings on the rotating framework of the jib of the dumping device in the neighborhood of the discharge end of the feed belt.

The removal device is preferably a scraper flight conveyor placed substantially radially to the axis of rotation of the framework and which includes a jib which can be pivoted about a horizontal axis and the length of which substantially corresponds with the breadth of the base of the dump.

Other objects, features and advantages of the invention shall become apparent as the description thereof proceeds when considered in connection with the accompanying drawing.

DESCRIPTION OF THE DRAWING

In the drawing which illustrates the best mode presently contemplated for carrying out the present invention:

FIG. 4 shows in a view similar to that of FIG. 1 another form of embodiment of the device according to the invention.

DESCRIPTION OF THE INVENTION

Figure 1:
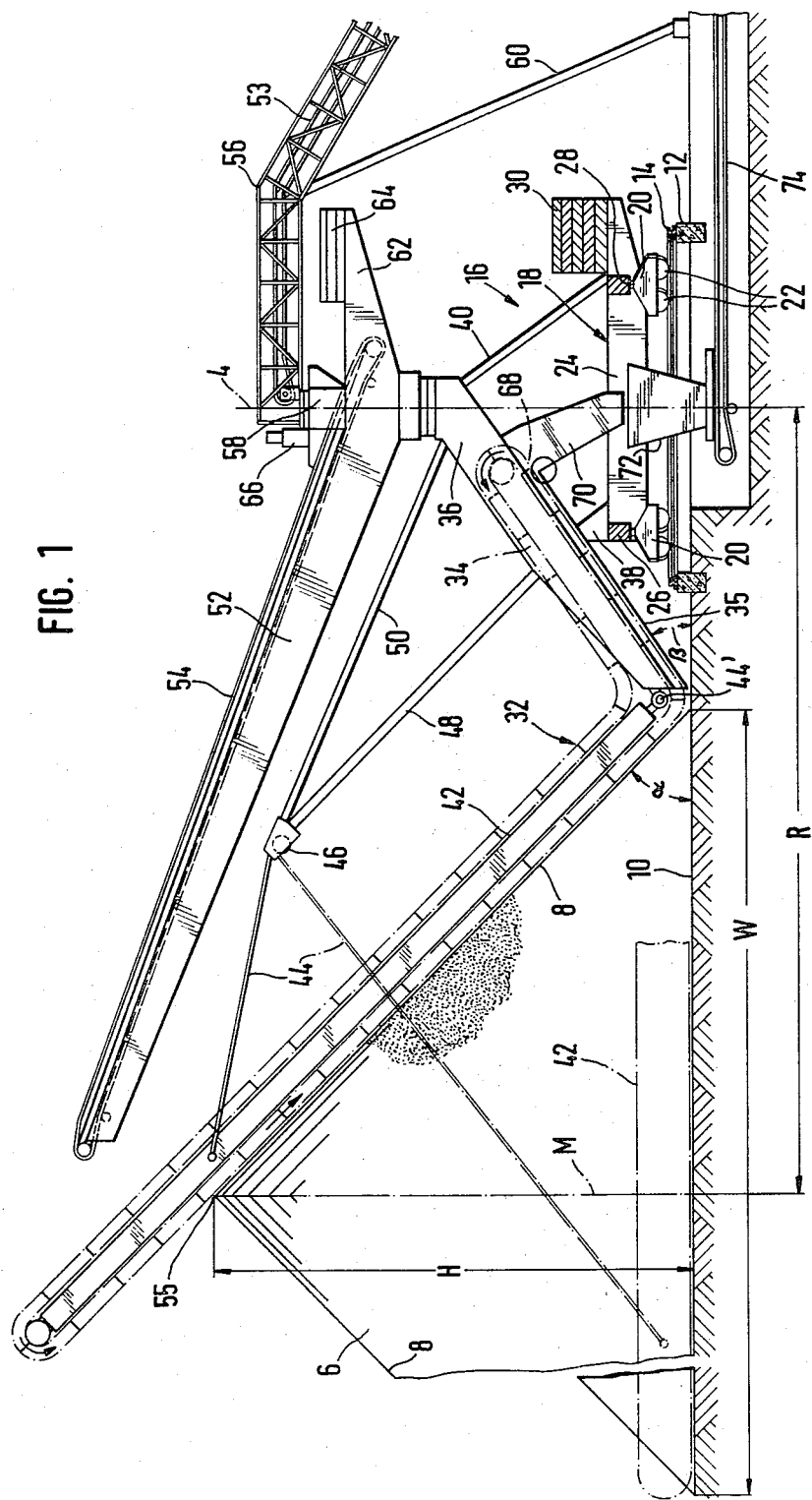
FIG. 1 shows a view of a first form of embodiment of a device according to the invention.
Figure 2:
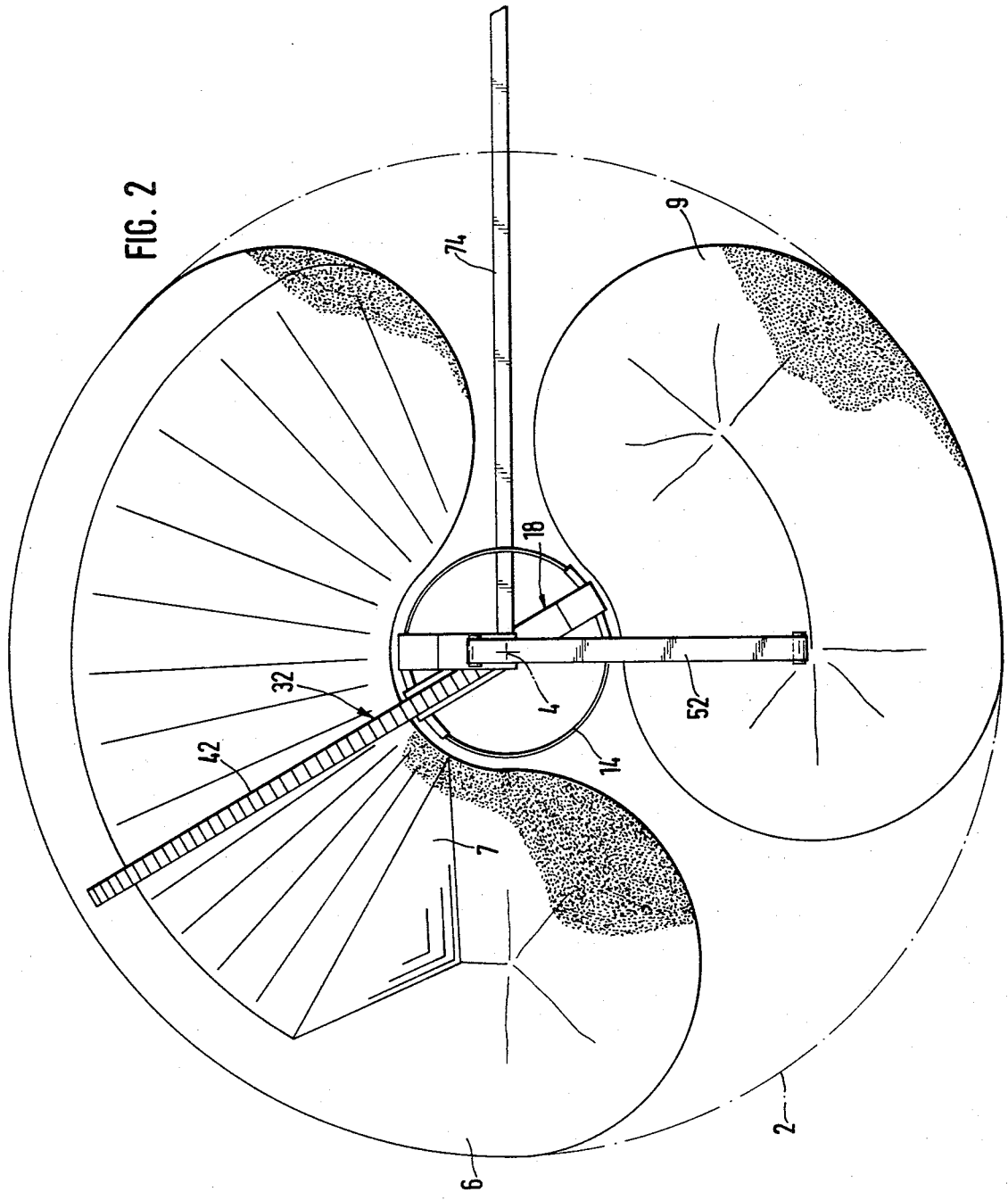
FIG. 2 shows a plan view of the device according to FIG. 1 in relation to an annular dump of bulk material.

FIGS. 1 and 2 illustrate a circular storage site 2 with a center which is shown by a vertical axis 4. The drawing shows on the circular storage site an annular dump 6 of bulk material which has an angle of repose, that is an angle $\alpha$ between its sides 8 and the horizontal 10 of, for example, 45°.

In the central region of the circular storage site 2 of the device, which is denoted as a whole by the reference number 16, is rotatable about the vertical axis 4 on an annular foundation 12 with a circular railway 14. The device 16 includes a framework 18 which has four undercarriages 20, each with two wheels 22. The wheels 22 run on a circular railway 14. They are provided with flanges by means of which the framework 14 is guided radially on the circular railway. The framework 18 includes two main girders 24 arranged parallel to and at a distance from each other, which are joined together by cross beams 26, 28 at the ends of which the undercarriages 20 are mounted. The girders 24 are extended outwards by the cross beams 28. These extensions serve as supports for a counterweight 30.

Connected to the framework 18 there is a scraper flight conveyor 32 with a fixed part 34 having a groove 35 extending upwardly therein, the fixed part 34 being supported in a framework section 36 which is itself supported on the framework 18 at 38 in the region of the cross beam 26. Additional support is provided by a steadying strut 40. The framework section 36 extends at an acute angle β to the plane of the circular railway 14. The scraper flight conveyor 32 also includes an arm 42 which can be pivoted about a horizontal axis 44' relative to the fixed section 34. The length of the arm 42 of the scraper flight conveyor corresponds approximately to the breadth W of the base of the dump. The arm 42 can be pivoted by means of a rope 44 which is led over a roller 46 of a jib structure with the two supports 48,50. The illustration shows the jib at an angle of 45° to the horizontal and thus parallel to the inner slope 8 of the dump. The horizontal setting is shown in dash dot lines.

On the upper end of the frame section 36 an arm 52 is mounted to rotate in bearings about the axis 4 and carries a belt conveyor 54. In addition there is provided a feeder belt 53 which is guided in a bridge 56 arranged with its inner end in the neighborhood of the vertical axis 4 and supported on the column sleeve 68. The bridge 56 is additionally supported by a support 60. The other end of the bridge 56 is situated at a not illustrated point outside the circular storage site 2.

The jib 52 of the dumping device together with the belt conveyor 54 has a length such that its discharge end is situated above the middle 55 of the dump. The jib 52 is provided with a counterbalancing arm 62 on which a counterweight 64 is supported. The belt conveyor 54 is led through the vertical axis 4 so that material conveyed by the feed belt 54 is discharged by the feed belt 54 in the neighborhood of the vertical axis 4. The rotary drive 66 of the jib 52 is, in the form of embodiment illustrated, fixed at the end of the bridge 56. It could also be arranged on the frame section 36.

A chute 70 is fixed on the framework 36 below the discharge end 68 of the scraper flight conveyor, the discharge end of the chute being situated in the neighborhood of the vertical axis 4 and, in particular, in the neighborhood of the upper end of a fixed hopper 72, the lower end of which is situated above the feed end of a belt conveyor 74 which is preferably arranged radially to the circular storage site and by means of which the material removed from the dump is led away.

The jib 52 of the dumping device is rotated continuously so that the material brought by the conveyor 53 is distributed uniformly over the length of the dump. The technique used for this purpose is known. Removal of material from the dump is carried out by means of the scraper flight conveyor which on each occasion removes a thin layer from the front face 7 of the dump 6, in that the jib 42 of the scraper flight conveyor is lowered gradually with simultaneous pivoting of the rotary support 18. As soon as the lowest end position is reached, which may be the horizontal position or even an end position lying below the horizontal, the jib is again pivoted upwards and the rotary support is turned through a working breadth of the scraper flight conveyor, when a fresh working cycle begins. As can be seen from FIG. 2, two partial dumps may be provided. The dump 6 is cleared away while dump 9 is simultaneously being built up.

Instead of a single dumping device, as in the form of embodiment of the device illustrated in FIGS. 1 and 2, two dumping devices which can be swivelled independent of each other could also be provided, each dumping device being fed separate feed conveyors. In this modification the jib of the second dumping device should be mounted to rotate in bearings above the end of the bridge 56, while a second feeder bridge should then open above the second dumping device.

Figure 3:
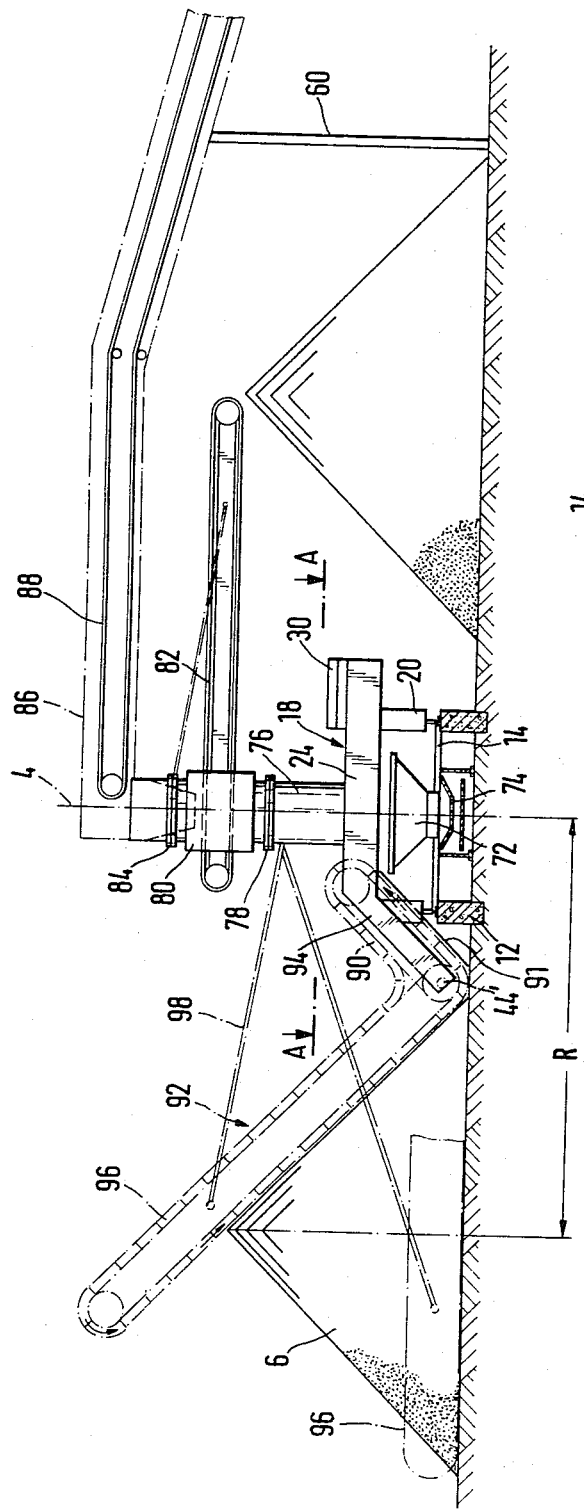
FIG. 3 shows in a view similar to that of FIG. 1 another form of embodiment of a device according to the invention.
Figure 3A:
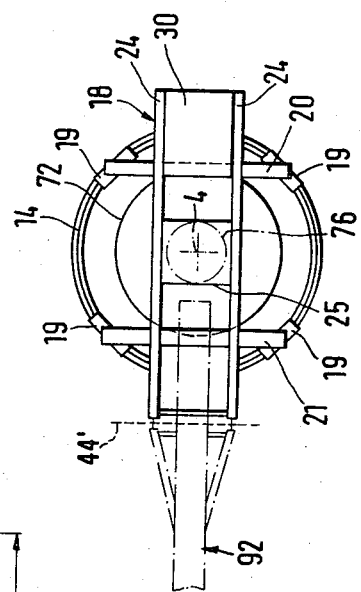
FIG. 3a is a sectional view taken along line A—A in FIG. 3.

Modified forms of embodiment are illustrated in FIGS. 3 and 4. The form of embodiment according to FIG. 3 corresponds substantially with that of FIG. 1. As seen in FIG. 3a, the two longitudinal supports 24 are located on opposite sides of the vertical axis 4 and are connected to each other by a structure 25 on which a column 76 is mounted, the column 76 rotating together with the frame 18. The frame 18 rests on the transversely located supports 20 and 21, at the ends of which are mounted the undercarriage 19, the frame 18 thus being rotatable on the circular railway 14. Located beneath the frame 18 is the hopper 72. The central column 76 is arranged on the rotatable framework 18 so that the pivot mounting 80 of the dumping device 82 is able to rotate in a bearing 78. The end of the bridge 86 containing the feed conveyor 88 is mounted in a bearing 84 on the upper end of the pivot mounting 80. The outward-directed fixed limb 90 of the scraper flight conveyor 92 which has a groove 91 formed therein forms the removal device and is mounted in bearings and in supports 94 which are arranged on the framework 18. The arm 96 of the scraper flight conveyor which can be swivelled up and down is moved up and down by means of a rope 98 which is shown schematically in FIG. 3. Additional individual characteristics of the form of embodiment according to FIG. 3 which are comparable with corresponding characteristics of the form of embodiment of FIGS. 1 and 2 are denoted by the reference numbers used in FIG. 1. In this connection reference should be made to the description of the form of embodiment according to FIGS. 1 and 2.

As a modification of the form of embodiment according to FIG. 1, in the form of embodiment according to FIG. 3 the belt conveyor 74 by means of which the material removed by the removal device is transported away is arranged above floor level, that is above the ground surface of the circular storage site. An underfloor arrangement such as shown in FIG. 1 could also be provided here. An under-floor arrangement is certainly more expensive. But it has the advantage that the dump can also be built up above the belt conveyor 74.

The capacity of a circular storage site with an annular dump is substantially dependent on the radius R of the central line M of the dump and the breadth W of the base of the dump. The height to which the dump can be built up over the breadth W is dependent on the angle of repose of the material. The maximum breadth of the base W of the dump depends on the maximum extendable length of the pivotable arm of of the scraper flight conveyor. This length is prescribed by the premissible tensile load on the driving chain of the scraper flight conveyor or by the required drive power of the scraper flight conveyor.

Since the breadth of base of the dump is thus prescribed in order to increase the capacity of a circular storage site in which a scraper flight conveyor is provided to remove the material there remains only the possibility of increasing the mean radius R of the dump. A form of embodiment of the device according to the invention by means of which circular storage sites with a large mean radius can be serviced is illustrated in FIG. 4. Once again in FIG. 4 the same reference numbers are used for parts of the form of embodiment according to FIGS. 1 to 3. As in the form of embodiment according to FIG. 3 a central column 76 is arranged on the framework 100, on which said column the jib 82 of the dumping device is able to rotate and on which there is once again situated the end of the bridge 86 which carries the feed conveyor 88. In the framework 100 there is arranged an intermediate conveyor 102 which may be designed as a belt conveyor. The feed end 104 of the intermediate conveyor 102 is situated below th delivery end 68 of the scraper flight conveyor while the delivery end 106 of the intermediate conveyor is situated above a fixed hopper 72 below which the belt conveyor 74 transporting the material is passed through which may be arranged, as shown by the full line, above ground or, as shown by the dotted line, underground. Up to a certain size the framework 100 can be constructed in a manner similar to the framework in the forms of embodiment according to FIGS. 1 and 3. The diameter of the circular railway is thus increased significantly. Such a form of embodiment is illustrated on the right hand side of FIG. 4 in dot-dash lines. With such a form of embodiment to the framework will quickly reach very large dimensions in particular because on account of the loads mounted on it very high bending moments must also be accepted. Unloading of the framework 100 can be achieved by providing in the central region a supporting structure 108 which includes a platform 110 on which the central region of the framework 100 is supported by means of rollers 112. In this way the weight of the central column 76 and the loads resting on it is diverted directly on to the foundation 114 of the supporting structure 108 through the rollers 112.

If such a supporting structure 108 is provided, this may be used at the same time to take over the radial guidance of the framework 100. For this purpose guide rollers 116 with a perpendicular axis of rotation 118 are provided which may be arranged on an annular guide rail 120 on the circumference of the platform 110. In such a form of embodiment the scraper flight conveyor 98 may be attached to an arm 122 which carries at the same time the intermediate conveyor 102 and which is supported, by means of a tread roller not illustrated in the drawing, on an annular railway 124 provided on an annular foundation 126. In this case the framework itself is limited to the section situated in the neighborhood of the platform 110. The arm 122 can be constructed at small expense in any desired radial length. With the basic conception of the device according to FIG. 4, in which a central section of the framework is supported and radially guided on a separate supporting structure, circular storage sites of widely different mean dump radius can be constructed and serviced. Only the length of the arm 122 of the framework, the length of the intermediate conveyor 102 and the length of the dumping device 82 need to be adapted to the desired mean radius of the dump in each case.

In the form of embodiment according to FIGS. 1 and 3 there is required to be constructed as foundation only an annular foundation 12 on which the annular railway 14 is mounted. Such a foundation can be constructed cheaply and easily. The same also holds when this annular foundation, as in the form of embodiment according to FIG. 4, has a larger diameter. In the form of embodiment according to FIG. 4, there is provided in addition only the foundation 114 on which the supporting structure 108 is supported. In this case only a simple block foundation is required which is again easily and cheaply constructed. It is then necessary only to mount on these foundations the prefabricated parts of the whole device as delivered.

An additional advantage consists in that in this device according to the invention there exists a free passage in the center of the framework below which the hopper is arranged through which material removed from the dump is conveyed to the belt conveyor which transports the material away from the storage site. There is thus no danger of blockage.

The invention is illustrated in the foregoing with reference to various forms of embodiment. These forms of embodiment and their description are not in any way to be taken as limiting. Devices according to the invention can rather be constructed in a large number of modified forms.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. Apparatus for removing and building up of bulk material from and onto heaps on a circular storage site, comprising a foundation having a vertical axis, a circular railway mounted on said foundation in concentric relation with respect to said vertical axis, a frame mounted on said railway for rotation therewith about said vertical axis, a central column mounted on said frame in generally coaxial relation with respect to said vertical axis and being rotatable with said frame about said vertical axis, a discharge hopper having an unobstructed upper receiving end, means for supporting said hopper in coaxial relation with respect to said vertical axis and independently of said central column, wherein said frame and column are rotated independently of said hopper, a material removal device mounted for rotation with said column and frame for removing said material from a heap and discharging it into said hopper without obstruction of said material by said hopper supporting means, and dumping means mounted on said column for independent rotation relative thereto and above said material removal device for selectively dumping material onto a heap for the removal therefrom by said removal device, said frame including parallel supports that extend generally parallel to the longitudinal axis of said material removal device, a structure joined to said supports on said frame and supporting said column thereon, wherein said column and frame are rotatable on said circular railway.

2. Apparatus as claimed in claim 1, a chute operatively interconnected to said material removal device at a delivery end thereof, said chute being located above the uppermost end of said hopper for delivery of said bulk material thereto.

3. Apparatus as claimed in claim 1, said material removal device including a conveyor belt having a feed end and a delivery end, said delivery end thereof being located above said hopper.

4. Apparatus as claimed in claim 1, said material removal device including discharging means that is interconnected to said frame for movement therewith but fixed in angular position relative thereto, said material removal device further including an elongated arm that is pivotally connected to said discharging means about a horizontal axis and that is angularly adjustable in accordance with the slope of said heap.

5. Apparatus as claimed in claim 4, the length of said arm corresponding approximately to the diameter of the base of said heap.

6. Apparatus as claimed in claim 5, support means joined to said frame and means connected to said support means and to the outer end of said arm for controlling the pivotal location of said arm in accordance with the angle of repose of said heap.

7. Apparatus as claimed in claim 4, said material removal device including a scraper flight conveyor that extends from said elongated arm to said discharging means, the angular relation of said discharging means being acute with respect to the horizontal.

8. Apparatus as claimed in claim 1, said material removal device including a scraper conveyor having a first arm the angular relation of which coincides with the slope of the heap on which material is to be removed and a second arm that is joined to said frame adjacent to said axis, the angle between said first and second arms being variable depending upon the slope of the heap on the surface of which said first arm is located.

9. Apparatus as claimed in claim 8, said frame bridging over the upper end of said hopper and spaced upwardly therefrom to provide for an unobstructed delivery for said material into said hopper, said second arm including a groove through which said material is transferred by said second arm to said hopper.

10. Apparatus as claimed in claim 1, said material removal device including an elongated inclined stationary support on which a conveyor is mounted, said stationary support and conveyor being located in parallel relation with respect to said parallel supports and intermediate a vertical extension thereof, said stationary support and conveyor being inclined at a predetermined angle relative to said parallel supports so that said material to be removed is conveyed above said hopper for discharge therein.

11. Apparatus as claimed in claim 10, said material removal device further including a pivotal support on which an extension of said conveyor is mounted, said pivotal support engaging a heap and being pivotally secured to said stationary support about a horizontal axis and being angularly adjustable in accordance with the slope of said heap.

12. Apparatus as claimed in claim 11, said material removal device further including an intermediate inclined conveyor, one end of which is supported between said parallel supports and the other end of which is located below the discharge end of said stationary support and conveyor, wherein said material discharged from said conveyor carried by said stationary support is conveyed above said hopper for deposit therein.

13. Apparatus for removing and building up of bulk material from and onto heaps on a circular storage site, comprising a foundation having a vertical axis, a circular support fixedly mounted on said foundation in concentric relation with respect to said vertical axis for receiving a load in bearing and rotating relation thereon, a frame mounted on said support for rotation therewith about said vertical axis, a central column mounted on said frame in generally coaxial relation with respect to said vertical axis and being rotatable with said frame about said vertical axis, a discharge hopper having an unobstructed upper receiving end, means for supporting said hopper in coaxial relation with respect to said vertical axis and independently of said central column, wherein said frame and column are rotated independently of said hopper, a material removal device mounted for rotation with said column and frame for removing said material from a heap and discharging it into said hopper without obstruction of said material by said hopper supporting means, and dumping means mounted on said column for independent rotation relative thereto and above said material removal device for selectively dumping material onto a heap for the removal therefrom by said removal device, said frame including parallel supports that extend generally parallel to the longitudinal axis of said material removal device, a structure joined to said supports on said frame and supporting said column thereon, wherein said column and frame are rotatable on said circular support.

* * * * *